UNITED STATES PATENT OFFICE.

FRITZ HOFMANN, CARL COUTELLE, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VULCANIZED CAOUTCHOUC-LIKE SUBSTANCE.

1,084,336.     Specification of Letters Patent.     Patented Jan. 13, 1914.

No Drawing.     Application filed March 20, 1911. Serial No. 615,668.

*To all whom it may concern:*

Be it known that we, FRITZ HOFMANN, CARL COUTELLE, KONRAD DELBRÜCK, and KURT MEISENBURG, doctors of philosophy, chemists, citizens of the German Empire, residing at Elberfeld, Germany, have invented new and useful Improvements in Vulcanized Caoutchouc-like Substances, of which the following is a specification.

By our application Ser. No. 594095 the production of new caoutchouc like substances is described, which are obtained by polymerizing hydrocarbons of the series:

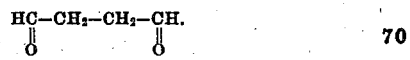

in which however one atom of H must be substituted by a substituting group containing more than one atom of carbon while the other hydrogen atoms may or may not be substituted for example:

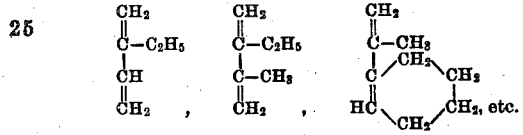

It has now been found that these caoutchouc like substances can be vulcanized, substances being obtained equal to and some even better than vulcanized natural caoutchouc. These facts could not be foreseen in the existent state of knowledge with regard to the nature and the processes during the vulcanizing of caoutchouc. One could not know if these new caoutchouc-like substances too would show the same behavior to vulcanizing agents as the natural caoutchouc does. Still less could one predict, whether the vulcanized products, if they could be obtained at all, would have the same valuable properties of vulcanized caoutchouc.

In order to illustrate our invention the following examples are given, the parts being by weight:—

Example 1: 100 parts of the product of polymerization obtained from beta-ethylerythrene are carefully worked together with 10 parts of sublimed sulfur in a mixing apparatus provided with rolls until a perfectly homogeneous mass results. The resulting product is brought into the desired shape and is then subjected in an iron vulcanizing vessel to the action of steam under a pressure of 3–4 atmospheres. After from 1–2 hours the process is complete.

Instead of the products of polymerization used in the examples a mixture of these caoutchouc like products with natural caoutchouc can be used. Similarly other methods of vulcanization can be employed.

The novel caoutchouc substances of the present invention yield among the decomposition products of their ozonids with water ethyl, phenyl, etc., derivatives (aldehydes or ketones) of succinic aldehyde

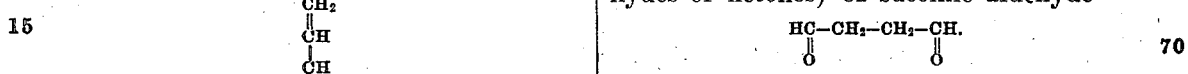

Thus the caoutchouc substance made from beta-ethyl erythrene caoutchouc by vulcanization yields among the decomposition products of its ozonid with water an ethyl derivative of succinic aldehyde. Mixtures of the novel caoutchouc substances with natural caoutchouc in addition yield levulinic derivatives and particularly levulinic aldehyde, the 1-methyl derivative of succinic aldehyde $CH_3—CO—CH_2—CH_2—CHO$.

We claim:—

1. As a new product a vulcanized caoutchouc-like substance comprising the vulcanized caoutchouc-like polymerization product of a substituted erythrene hydrocarbon in which at least one atom of hydrogen is substituted by a group containing more than one atom of carbon, being a grayish non-adhesive substance containing sulfur and forming ozonids which upon decomposition with water yield substituted derivatives of succinic aldehyde.

2. As a new product of vulcanized caoutchouc-like substance comprising the vulcanized caoutchouc-like polymerization product of a substituted erythrene hydrocarbon in which one atom of H in beta position is substituted by a group containing more than one atom of carbon, being a grayish non-adhesive substance containing sulfur and forming ozonids which upon decomposition with water yield substituted derivatives of succinic aldehyde.

3. As a new product of vulcanized caoutchouc-like substance comprising the vulcanized caoutchouc-like polymerization product of beta-ethyl erythrene, being a grayish non-adhesive substance containing sulfur and forming an ozonid which upon decomposition with water yields an ethyl substituted derivative of succinic aldehyde.

4. As a new product of vulcanized caoutchouc-like substance comprising a vulcanized mixture of natural caoutchouc and the caoutchouc-like polymerization product of a substituted erythrene hydrocarbon in which at least one atom of hydrogen is substituted by a group containing more than one atom of carbon, being a grayish non-adhesive substance containing sulfur and forming ozonids which upon decomposition with water yields levulinic aldehyde and other substituted derivatives of succinic aldehyde.

5. As a new product a vulcanized caoutchouc-like substance comprising a vulcanized mixture of natural caoutchouc and the caoutchouc-like polymerization product of a substituted erythrene hydrocarbon having an atom of H in beta position substituted by a group containing more than one atom of carbon, being a grayish non-adhesive substance containing sulfur and forming ozonids which upon decomposition with water yields levulinic aldehyde and other substituted derivatives of succinic aldehyde.

6. As a new product a vulcanized caoutchouc-like substance comprising a vulcanized mixture of natural caoutchouc and beta-ethyl-erythrene caoutchouc, being a grayish non-adhesive substance containing sulfur and forming ozonids which upon decomposition with water yield levulinic aldehyde and an ethyl derivative of succinic aldehyde.

In testimony whereof we have hereunto set our hands in the presence of two subscribing witnesses.

FRITZ HOFMANN. [L. S.]
CARL COUTELLE. [L. S.]
KONRAD DELBRÜCK. [L. S.]
KURT MEISENBURG. [L. S.]

Witnesses:
CHAS. J. WRIGHT,
ALFRED HENKEL.